Feb. 24, 1959
J. S. WOLFE
2,875,091
METHOD OF SOLDERING
Filed Nov. 13, 1956
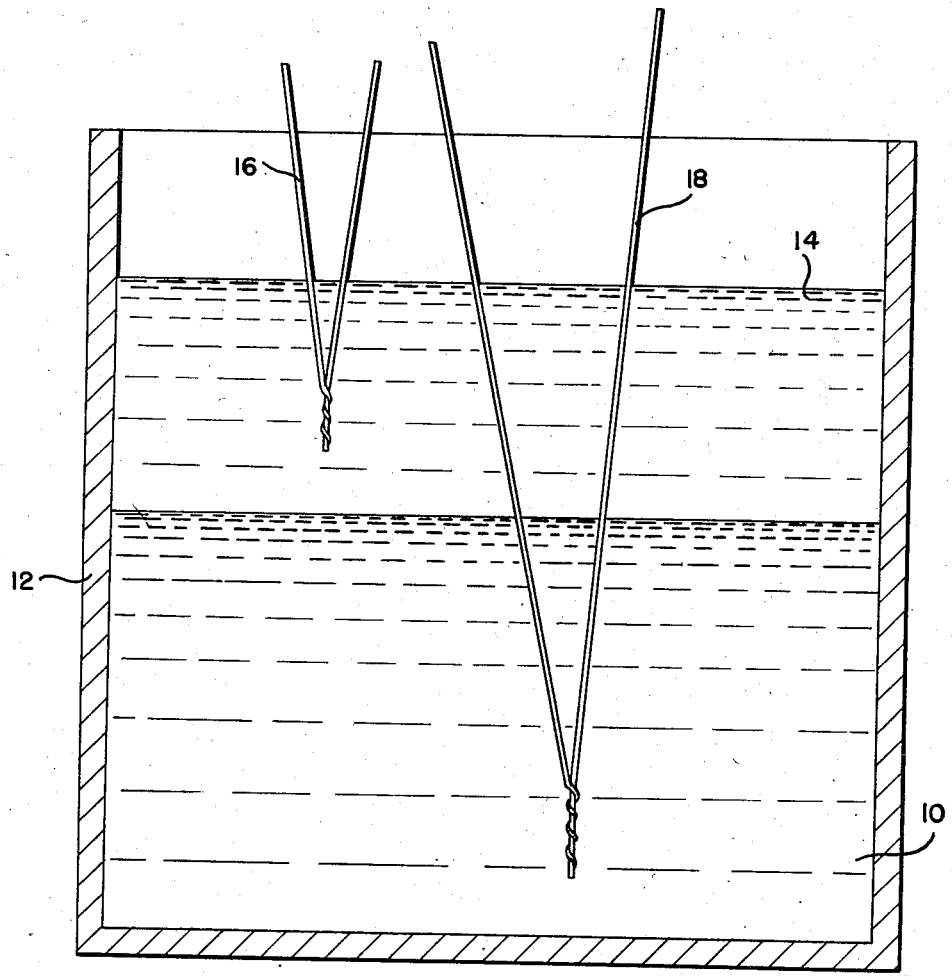
INVENTOR.
John S. Wolfe
BY D. C. Staley
His Attorney

2,875,091

METHOD OF SOLDERING

John Sohn Wolfe, Dayton, Ohio, assignor to General Motors Corporation, Detroit, Mich., a corporation of Delaware Application November 13, 1956, Serial No. 621,643

5 Claims. (Cl. 117—52)

This invention relates to a method of soft soldering aluminum and aluminum alloys.

Among the problems involved in soldering aluminum and aluminum alloys, is that solders wet these metals with great difficulty even though the metal is cleaned and treated with a flux. Of the prior known methods of soldering aluminum and aluminum alloys, that which involves immersing the aluminum containing surface in molten zinc and applying solder to the zinc coated surfaces is relatively satisfactory. The process has the disadvantage that particularly pure zinc must be used to obtain a satisfactory soldered joint and the metal surfaces must be protected from oxidizing agencies during the course of the soldering operation.

Among the objects of the present invention is to provide an economical and efficient method of soldering aluminum and aluminum alloy surfaces which utilizes the principle of applying a zinc coating of the aluminum containing surfaces prior to the application of zinc thereto but which eliminates the use of molten zinc, employs relatively low temperatures throughout the soldering operation, and protects the metal surfaces from the oxidizing influences of the air throughout the soldering operation. These and other objects are carried out by providing a low temperature molten solder bath with a liquid cover layer comprising an alkali metal zincate and an alkali metal hydroxide in a suitable vehicle or solvent solution. Aluminum or aluminum alloy parts to be soldered are merely inserted into the solder through the cover layer.

Further objects and advantages of the present invention will be apparent from the following description, reference being had to the accompanying drawings wherein preferred embodiments of the present invention are clearly shown.

In the drawing:

The figure is a diagrammatic view of a soldering bath which may be used in carrying out the invention.

Referring now to the drawing, the present invention may be carried out by providing a molten low melting point solder 10 held in a suitable container 12, which has provided thereover a liquid cover layer 14 comprising an alkali metal zincate and an alkali metal hydroxide dissolved in a suitable vehicle or solvent. The solder 10 and the layer 14 are selected so that the cover layer 14 has a boiling point markedly higher than the melting point of the solder so that the former is not evaporated during the operation of the soldering bath.

Examples of suitable low melting point solders which may be used include the lead-tin eutectic and a 50% lead—32% tin—8% cadmium alloy having melting points of about 183° C. and 145° C. respectively. Other suitable solders include 50% lead—50% tin alloy, indium, indium-tin-cadmium eutectic as well as low melting point solders including various percentages of cadmium, tin, lead and bismuth having melting temperatures as low as 65° C. which are well known in the art.

A suitable cover layer 14 may be prepared by reacting zinc oxide or metallic zinc with a suitable base or caustic such as sodium hydroxide, to form sodium zincate associated with an excess of sodium hydroxide. Water is then added in an amount markedly less than that required to reduce the boiling point of the solution down to the boiling point of the specific solder used. Since the boiling point of sodium hydroxide is in the neighborhood of 139° C., substantial dilution of the solution may be effected without reducing the boiling point of the solution to the melting point or operating temperature of the solder. Since the proportion of the above constituents in the cover layer is not otherwise critical, the proportions of the constituents may vary widely. For use with a tin-lead-cadmium eutectic having a melting point of 145° C., a suitable cover layer may be made up having the following original composition: 80 grams sodium hydroxide; 3 grams zinc oxide; and 17 grams water. This composition is heated above melting point to cause a reaction between the zinc oxide and sodium hydroxide to effect a solution containing water, sodium hydroxide and sodium zincate.

To effect a soldered joint between two aluminum containing work pieces, as for example the ends of a pair of aluminum lead wires, the wire ends are inserted into the cover layer as indicated by the numeral 16. At this stage the excess sodium hydroxide in the cover layer removes the aluminum oxide film and a thin zinc film is plated on the oxide free aluminum surface by reason of zinc being lower in the electromotive series than aluminum. Thereafter the wire ends are passed through the cover layer 14 into the molten solder as indicated by the numeral 18 whereby the solder wets the zinc plated surfaces to solder the wire ends together. Best results are obtained by dipping the work pieces into the cover layer and molten solder several times, each of about one second duration. It has been found that cover layer temperatures of about 200° C. or below produce a superior zinc plate. Experimental tests have shown that a highly satisfactory solder type joint results having an electrical resistivity, when measured with No. 18 aluminum wire, of 5 to 15 millionths of an ohm per inch greater than the resistivity wire itself which may be considered negligible. Other metal parts such as copper, nickel and steel may be joined to aluminum containing parts with equally satisfactory results.

It will be noted that in the above described method the parts to be joined are protected from the oxidizing influence since both the cleaning or fluxing of the work pieces and the zinc plating is performed within the cover layer 14 and thereafter the soldering is performed by a progressive insertion of the work pieces into the molten solder without exposing the cleaned aluminum surfaces or zinc plate to the atmosphere prior to the application of the solder which would adversely effect the quality of the soldered joint. Moreover the method affords a means of plating relatively pure zinc onto the aluminum surfaces.

Although sodium hydroxide is a preferred base for use in the cover layer because of its cheapness, other strong bases such as the hydroxides of alkali metals such as potassium or lithium may be used.

The water solvent of layer 14 may advantageously be replaced by high boiling point organic solvents. The preferred organic solvents are primary polyhydric alcohols such as the glycols or diols, and triols. The alcohols having a plurality of hydroxy groups have a greater solubility for the zincate and the caustic than monohydric alcohols or other organic solvents and have higher boiling points. Moreover the primary polyhydric alcohols are less reactive to the caustic than the secondary or tertiary polyhydric alcohols with the result that the strength of the caustic in the cover layer is not substantially reduced by a reaction between the solvent and the caustic. However most organic materials having hydroxy groups including organic acids, such as citric, which have sufficiently high boiling points are useful to some degree. Of these compounds mono-primary alcohols such as benzyl alcohol have been found superior. Examples of the preferred primary polyhydric alcohols include ethylene glycol; 1,3 propanediol; 1,4 butanediol; 2,2 bis(hydroxy methyl) 1 butanol and pentaerythritol. Mixtures of these materials may also be used. For use with a tin-lead-cadmium eutectic having a melting point of 145° C., a suitable cover layer using an organic solvent may be made up having the following original composition: 90 grams ethylene glycol; 9 grams sodium hydroxide; and 1 gram zinc oxide. These materials are heated to cause a reaction between these materials and the reacted materials are added to the ethylene glycol.

The basic advantage in the use of an organic solvent of the type described above is that it permits the use of the caustic and the zincate in lesser concentrations and maintains the boiling point of the cover liquid at a desired point.

Continued use of the soldering bath results in an increasing deposit of aluminum oxide and other materials in the cover liquid with the result that its effectiveness is reduced and must eventually be replenished. The life of the cover layer may be prolonged by the use of a preparatory bath comprising an aqueous solution of caustic and alkali metal zincate of relatively low concentration. The preparatory bath may contain for example as low as 5% sodium zincate and sufficient sodium hydroxide to effect adequate cleaning of the aluminum surfaces. A suitable preparatory bath may have the following original composition: 80 grams water; 16 grams sodium hydroxide; and 4 grams zinc oxide. For best results the temperature of the preparatory bath is held between 65° and 85° C. The aluminum work pieces are first dipped into the preparatory bath wherein the parts are cleaned or fluxed and a zinc plate is deposited thereon. Since this preparatory bath is of relatively low concentration it may be replenished by the addition of caustic and zincate for a substantial time before it becomes excessively viscous. The parts are then dipped into the solder bath through the cover layer as before wherein the parts are further fluxed and zinc plated before being dipped into the molten solder. With this technique a single dip of about one second duration in the preparatory bath followed by a dip in the solder bath produces satisfactory results.

Since most of the fluxing and zinc plating is performed in a separate bath the cover solution may be used a substantially greater time before it may require replenishing.

Since solder joints of the character disclosed are subject to atmospheric corrosion at the aluminum-zinc or solder-zinc interface, the joint is preferably finally coated with a suitable sealant such as a suitable paint or plaster material.

While the embodiments of the present invention as herein disclosed constitute preferred forms, it is to be understood that other forms might be adopted.

What is claimed is as follows:

1. A soldering bath for soldering metals selected from the group consisting of aluminum and aluminum alloys, comprising molten low melting point solder having superimposed thereover a liquid cover layer having a boiling point greater than the melting point of said solder, said cover layer comprising a solution including an alkali metal zincate, an alkali metal hydroxide, dissolved in a solvent taken from the class consisting of water and polyhydric alcohols.

2. Claim 1 wherein said cover layer comprises an alkali metal zincate and an alkali metal hydroxide dissolved in water.

3. Claim 1 wherein the said cover layer comprises an alkali metal zincate and an alkali metal hydroxide dissolved in a polyhydric alcohol.

4. Claim 1 wherein the said cover layer comprises sodium zincate and sodium hydroxide dissolved in water.

5. Claim 1 wherein the said cover layer comprises sodium zincate and sodium hydroxide dissolved in a primary polyhydric alcohol.

References Cited in the file of this patent
UNITED STATES PATENTS

| | | |
|---|---|---|
| 733,662 | Lange | July 14, 1903 |
| 1,627,900 | Hewitson | May 10, 1927 |
| 2,418,265 | Korpium | Apr. 1, 1947 |
| 2,654,701 | Calderon | Oct. 6, 1953 |